(12) United States Patent
Uemura et al.

(10) Patent No.: US 7,174,360 B2
(45) Date of Patent: Feb. 6, 2007

(54) METHOD FOR FORMING VIRTUAL NETWORK STORAGE

(75) Inventors: Tetsuya Uemura, Sayama (JP); Shinji Fujiwara, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 621 days.

(21) Appl. No.: 10/234,235

(22) Filed: Sep. 5, 2002

(65) Prior Publication Data

US 2004/0019655 A1    Jan. 29, 2004

(30) Foreign Application Priority Data

Jul. 23, 2002    (JP) .............................. 2002-213245

(51) Int. Cl.
*G06F 15/16* (2006.01)
(52) U.S. Cl. .................. 709/201; 709/214; 709/215; 709/217; 709/226; 711/148
(58) Field of Classification Search ........ 709/214–217, 709/201–203, 226, 225, 213; 711/6, 113, 711/114, 162, 148; 707/102, 200, 103 R
See application file for complete search history.

(56) References Cited

U.S. PATENT DOCUMENTS

| | | | | |
|---|---|---|---|---|
| 5,931,918 A * | 8/1999 | Row et al. ................... | 719/321 |
| 6,029,168 A | 2/2000 | Frey | |
| 6,067,599 A * | 5/2000 | Kishi et al. ................. | 711/113 |
| 6,269,432 B1 * | 7/2001 | Smith ......................... | 711/162 |
| 6,343,316 B1 * | 1/2002 | Sakata ........................ | 709/213 |
| 6,421,711 B1 * | 7/2002 | Blumenau et al. .......... | 709/213 |
| 6,529,997 B1 * | 3/2003 | Debiez et al. ............... | 711/114 |
| 6,820,168 B2 * | 11/2004 | Tanaka et al. ................ | 711/6 |
| 6,842,784 B1 * | 1/2005 | Black .......................... | 709/225 |
| 6,877,011 B2 * | 4/2005 | Jaskiewicz .................. | 707/102 |
| 6,912,548 B1 * | 6/2005 | Black .......................... | 707/200 |
| 6,988,130 B2 * | 1/2006 | Blumenau et al. .......... | 709/213 |
| 2001/0037371 A1 * | 11/2001 | Ohran ......................... | 709/214 |
| 2002/0083111 A1 * | 6/2002 | Row et al. ..................... | 709/1 |
| 2002/0133491 A1 * | 9/2002 | Sim et al. ..................... | 707/10 |
| 2003/0037061 A1 * | 2/2003 | Sastri et al. ............. | 707/103 R |
| 2003/0115218 A1 * | 6/2003 | Bobbitt et al. .............. | 707/200 |

OTHER PUBLICATIONS

Baird "Virtual storage architecture guide" 1995 IEEE, pp. 312-326.*
John H. Hartman and John K. Ousterhout, "The Zebra Striped Networki File System", Electrical Engineering and Computer Sciences, Univ. of California.

* cited by examiner

*Primary Examiner*—Van H. Nguyen
(74) *Attorney, Agent, or Firm*—Reed Smith LLP; Stanley P. Fisher, Esq.; Juan Carlos A. Marquez, Esq.

(57) ABSTRACT

Disclosed is a method for forming a virtual network storage using general network storages and through the processing by a network storage accessing protocol without using any dedicated network storages, concentrated management servers, or distributed directories. The virtual network storage, when receiving a READDIR request from a client, transfers the received READDIR request to each network storage, and receives READDIR responses from the network storages. The virtual network storage then combines the READDIR responses from the network storages and sends the result to the client. This solves the problem caused by increasing the number of network storages wherein a centralized management server becomes a bottleneck that would hinder the improvement of the system scalability, as well as the problem of using dedicated network storages that disables the employment of existing network storages for forming a virtual network storage.

24 Claims, 5 Drawing Sheets

F I G. 2
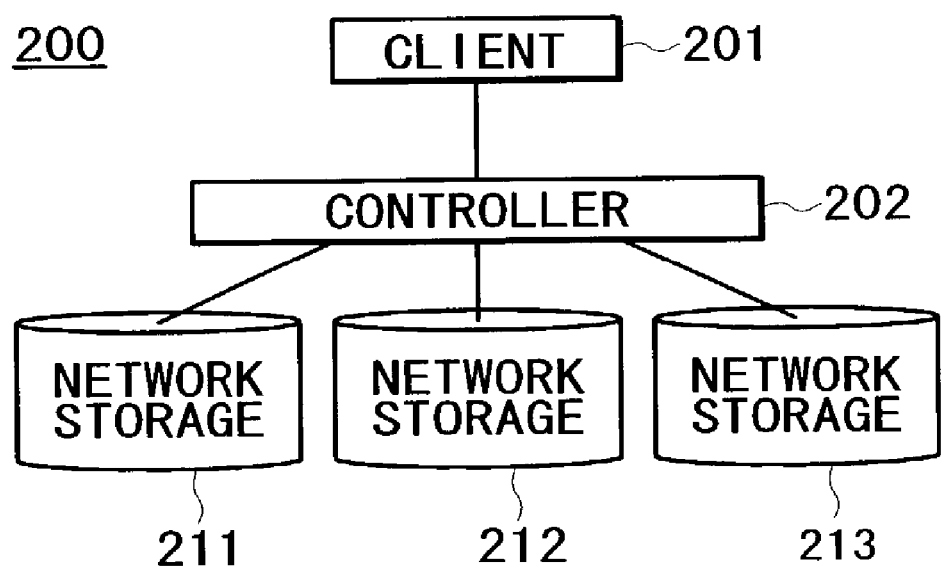

METHOD FOR FORMING VIRTUAL NETWORK STORAGE

BACKGROUND OF THE INVENTION

1. Field of the Invention

The present invention relates to a method for forming a virtual network storage by uniting a plurality of network storages into one. More particularly, the invention relates to a method for forming a virtual network storage, which transfers a request from a client to each of the plurality of network storages, combines responses from those network storages into one response and then send the response to the client.

2. Description of Related Art

Each of the conventional information processing systems has stored information in a storage connected directly to a computer system. The information stored in the storage is accessed only from the computer system. All other computer systems, when accessing the information in the storage, are required to access the information through the directly connected computer system. In recent years, however, according to the progress of the network technique and the rapid increase of an amount of information to be stored, information storages come to be separated from information processing computer systems. Under such circumstances, there has appeared a storage system that enables information to be shared among a plurality of computer systems connected to a network. A storage connected to a network in such a way is referred to as a network storage.

Examples of the network storage are, for one, the storage area network (SAN) storage connected through a SAN to enable block accesses, the network attached storage (NAS) connected through an IP network, the Infiniband, or the like to enable file accesses and the Web storage that enables accesses with use of the HTTP protocol which is an interface for Web accesses, as well as another protocol expanded from the HTTP protocol.

As the network storages come into wide use, each system manager comes to be required to manage a plurality of network storages connected to a network. For example, when an amount of data to be stored exceeds the maximum capacity of an existing network storage, the system manager rebuilds the system so as to add new network storages to the system and assure the rearrangement of data. This has resulted in a significant increase of the system management cost.

In order to suppress the system management cost, a technique for forming a virtual storage is indispensable. The technique unites a plurality of network storages so that those storages virtually look like one network storage from the computer systems, thereby addition of any new storages does not affect the whole system. There have been developed and proposed many methods for forming such a virtual storage system.

The Zebra System (The Zebra Striped Network File System, Harman et. al., ACM Transactions on Computer System, vol.13, No.3, 1995, pp.274–310) disclosed by Harman et. al in 1995 is one of those methods. According to this method, one file is distributed to and stored in a plurality of network storages. Concretely, a file is striped into units of a certain length and stored in a plurality of network storages sequentially with use of the round robin method. The Zebra System employs a centralized management server that controls the order for storing the striped and distributed blocks of a file in those network storages. A computer system, before accessing the file, inquires the management server of stored file block locations. In other words, a file is distributed and stored in a plurality of servers and one server manages those servers exclusively. In this way, a plurality of network storages look like one network storage virtually.

Alexander H. Fray et. al have also proposed another method (U.S. Pat. No. 6,029,168, Filed: 1998 Jan. 23) for striping a file with use of a non-centralized management server, which is different from the Zebra centralized management server. According to this method, starter node information in which file striping information is stored is embedded in the file identifier, thereby the striping information managed exclusively by the Zebra is distributed in and managed by a plurality of network storages. At this time, because the starter node is stored in the file identifier, the starter node is accessed first to determine the file block locations before the access to the file. An access request is transferred to the server that stores target file blocks as needed to process the file data. The client is just requested to issue the request to the starter node to access the target file. The client is not requested to take any consideration to the file block locations generated by the file striping.

However, the Zebra System requires the client to inquire the centralized management server of the network storages that store target file blocks before accessing the file. Especially, when in updating a file, the system is required to update not only the data in the network storages, but also the data in the centralized management server. Consequently, when the number of network storages increases, the centralized management server becomes a bottleneck that might hinder the improvement of the system scalability.

The method proposed by Alexander et. al, which uses a non-centralized management server, solves the problem of the Zebra System successfully, since the management server is shared by a plurality of servers. In spite of this, the method premises that such a server as a distributed directory server, etc. converts a file name or directory name used to identify a target file to access uniquely to a file identifier in which the starter node is embedded. In this connection, information for managing the correspondence between the server (starter node) that manages file locations and the file name is also required. In the embodiment disclosed in the U.S. Pat. No. 6,029,168, a "well-known" distributed directory file is used as means for storing the information. Because the location of the starter node is embedded directly in the file identifier, the information denoting the correspondence between the file name stored in the distributed directory and the file identifier must be updated when the starter node of an existing file is moved to the new network storage as a result of addition of a new network storage.

In addition, each of those methods that employ the conventional techniques uses only dedicated network storages to form a virtual network storage; it cannot use different types of network storages to form a virtual network storage. In other words, none of the conventional methods can unite different types of network storages into one virtual network storage to reduce the system management cost nor reduce the operation cost of existing network storages. This has been a problem of the conventional techniques.

According to any of the conventional methods, when a management server is used, both of file management information and data body are stored in two different servers. Accesses to a file are thus disabled when an error occurs in one of the servers. This has been another problem of the conventional methods.

SUMMARY OF THE INVENTION

Under such circumstances, it is an object of the invention to provide a method for forming a virtual network storage by uniting only general network storages into one.

In order to achieve the object, the method of the invention for forming a virtual network storage by employing only general network storages as described above can preferably take any of the following configurations.

In one aspect of the invention, the method comprises the steps of: receiving a request from a client; a step of transferring the received request to first and second network storages; receiving a response from the first network storage in response to the transferred request; receiving a response from the second network storage in response to the transferred request; combining responses from the first and second network storages; and sending the combined response to the client.

In another aspect of the invention, the method comprises the steps of: transferring the received request to each of the plurality of network storages; receiving a response from each of the plurality of network storages in response to the transferred request; determining whether or not each of the received responses is successful; and combining only successful responses of the determined responses.

In still another aspect of the invention, the method comprises the steps of: transferring the request to each of the plurality of network storages; receiving a response from each of the plurality of network storages in response to the transferred request; determining whether or not each of the received responses is successful; and sending one successful response selected from among responses determined as successful.

The method can further includes the step of: storing both of the network storage identification information and the access identifier involved in the network storage response in a buffer area, or the step of managing the consistency among entry information of the plurality of network storages.

In yet another aspect of the invention, the method comprises the steps of: detecting the operation condition of each of the network storages; generating an entry that includes error information at the time of error detection; receiving a request from a client; combining entry information of normally operating network storages among the plurality of network storages and the entry information that includes the generated error information to generate a response message to be sent in response to the request received from the client; and sending the generated response message to the client.

The method can also include the step of: checking the consistency between the entry information of each of the plurality of network storages included in the virtual network storage and the entry information of the new network storage.

The method can also include the steps of: generating a virtual entry that denotes a specific network storage among the plurality of network storages included in the virtual network storage; determining whether or not a request from a client is addressed to the virtual entry; and transferring the request from the client to the specific network storage when the client request is addressed to the virtual entry.

The method can also include the step of: storing necessary information used to operate the plurality of network storages included in the virtual network storage in each of the plurality of network storages.

The method can also include the step of: balancing a load of each of the plurality of network storages.

The method can include the steps of: registering the identifier of each of the plurality of network storages; registering information for accessing each of the plurality of network storages; and registering manager information of the plurality of network storages.

BRIEF DESCRIPTION OF THE DRAWINGS

FIG. 2 is a block diagram of a network connection in the embodiment of the invention for forming the virtual network storage;

DETAILED DESCRIPTION OF THE PREFERRED EMBODIMENTS

Figure 1:
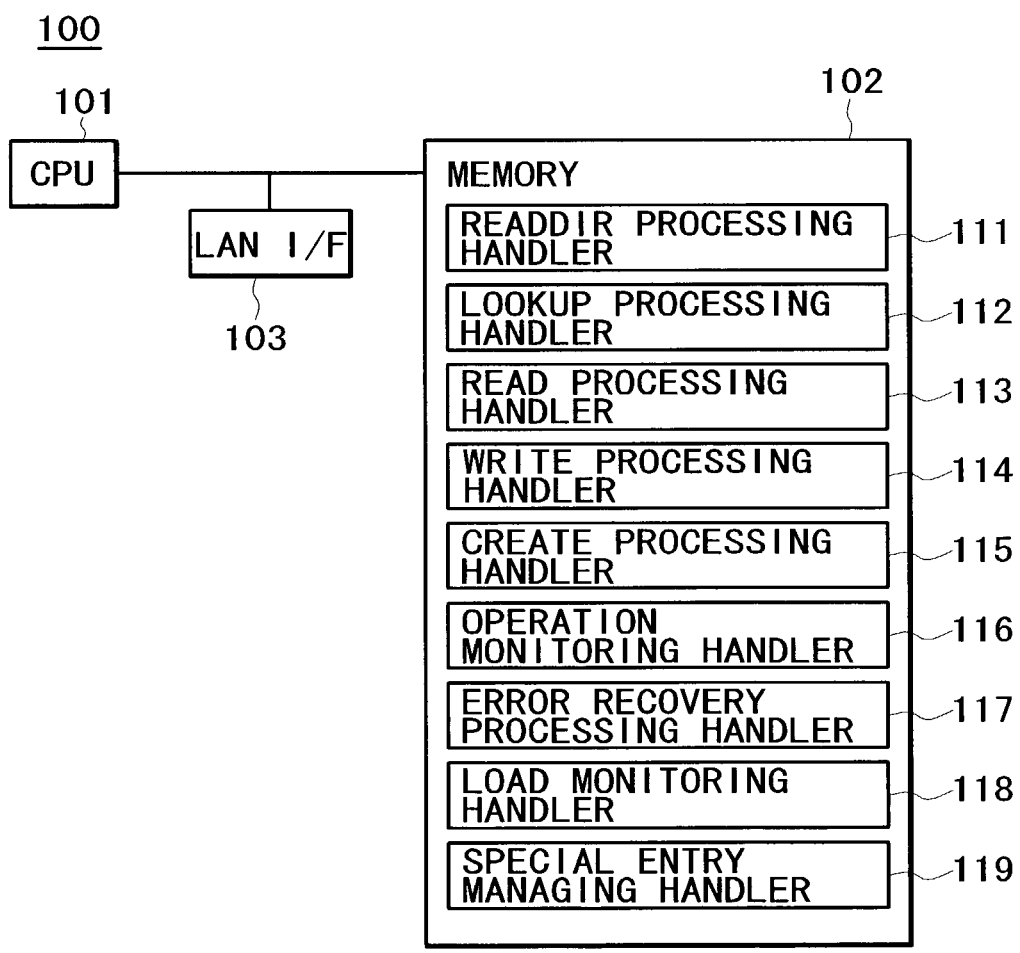
FIG. 1 is a block diagram of an architecture in an embodiment of the invention for forming a virtual network storage.

Hereunder, a preferred embodiment of the invention will be described with reference to the accompanying drawings. In this embodiment, the same reference numerals will be used for the same items in all the accompanying drawings. READDIR to appear in this embodiment means an operation that takes out a given number of entries sequentially from a directory and returns both of name and identifier of the corresponding file together with the information used by a client to request another entries with another READDIR request later. LOOKUP means an operation that searches a filename from a directory and returns both of a file handle and an attribute of the corresponding file system object. Furthermore, an entry means a unit for storing the information related to a file in a directory or the information of a directory itself.

FIG. 1 shows a block diagram of an architecture in an embodiment of the invention for a method for forming a virtual network storage. In FIG. 1, reference numeral 100 denotes the architecture in the embodiment of the invention for a method for forming the virtual network storage. Reference numerals 101, 102, and 103 denote a CPU, a memory, and a LAN connection interface respectively. Reference numeral 111 denotes a READDIR processing handler, reference numeral 112 denotes a LOOKUP processing handler, reference numeral 113 denotes a READ processing handler, reference numeral 114 denotes a WRITE processing handler, reference numeral 115 denotes a CREATE processing handler, reference numeral 116 denotes an operation monitoring handler, reference numeral 117 denotes an error recovery processing handler, reference numeral 118 denotes a load monitoring handler, and reference numeral 119 denotes a special entry managing handler.

FIG. 2 shows a diagram of a network connection in the embodiment of the invention for the method for forming the virtual network storage. In FIG. 2, reference numeral 200 denotes the network connection diagram in the embodiment of the invention for the method for forming the virtual network storage. Reference numeral 201 denotes a client and reference numeral 202 denotes a controller for the virtual network storage in the embodiment of the invention. Reference numerals 211, 212, and 213 denote a first network storage, a second network storage, and a third network storage respectively.

Figure 3:
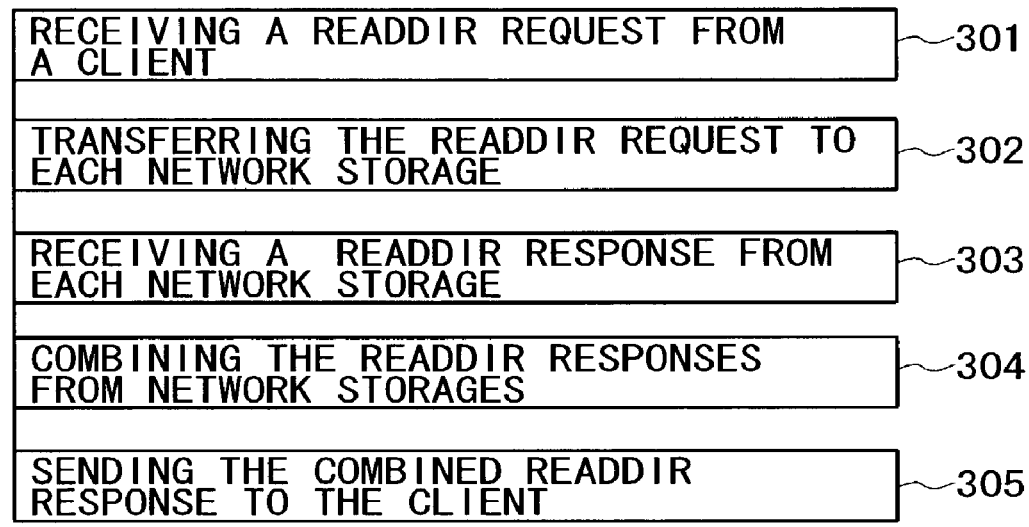
FIG. 3 is a flowchart of the processings by a READDIR processing handler 111 in the embodiment of the invention for forming the virtual network storage.

FIG. 3 shows a flowchart of the processings by the READDIR processing handler in the embodiment of the invention for the method for forming the virtual network storage. In FIG. 3, reference numeral 301 denotes a step of receiving a READDIR request from a client, reference numeral 302 denotes a step of transferring the READDIR request to each network storage, reference numeral 303 denotes a step of receiving a READDIR response from each network storage, reference numeral 304 denotes a step of combining the READDIR responses from the network storages, and reference numeral 305 denotes a step of sending the combined READDIR response to the client.

Figure 4:
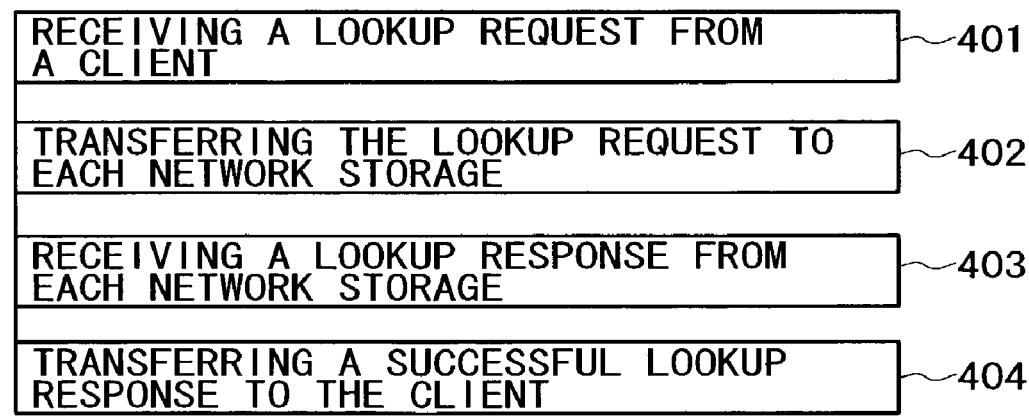
FIG. 4 is a flowchart of the processings by a LOOKUP processing handler 112 in the embodiment of the invention for forming the virtual network storage.

FIG. 4 shows a flowchart of the processings by the LOOKUP processing handler 112 in the embodiment of the invention for the method for forming the virtual network storage. In FIG. 4, reference numeral 401 denotes a step of receiving a LOOKUP request from a client, reference numeral 402 denotes a step of transferring the LOOKUP request to each network storage, reference numeral 403 denotes a step of receiving a LOOKUP response from each network storage, and reference numeral 404 denotes a step of transferring a successful LOOKUP response to the client.

Figure 5:
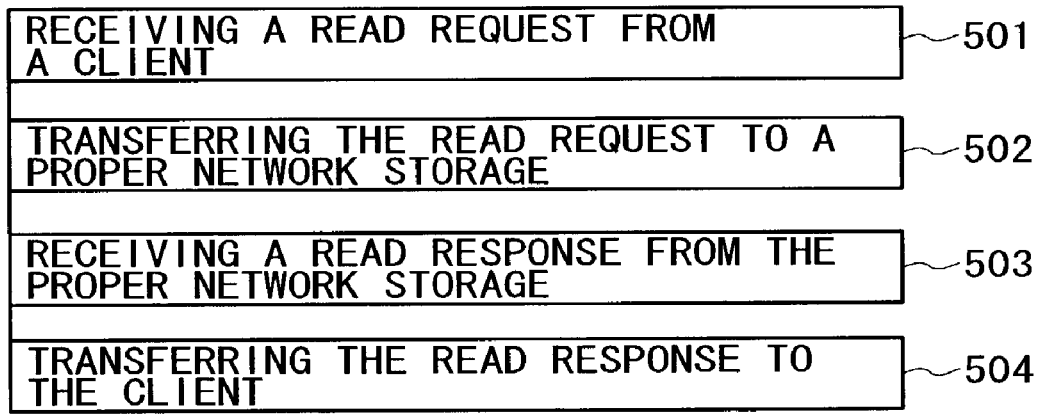
FIG. 5 is a flowchart of the processings by a READ processing handler 113 in the embodiment of the invention for forming the virtual network storage.

FIG. 5 shows a flowchart of the processings by the READ processing handler 113 in the embodiment of the invention for the method for forming the virtual network storage. In FIG. 5, reference numeral 501 denotes a step of receiving a READ request from a client, reference numeral 502 denotes a step of transferring the READ request to a proper network storage, reference numeral 503 denotes a step of receiving a READ response from the proper network storage, and reference numeral 504 denotes a step of transferring the READ response to the client.

Figure 6:
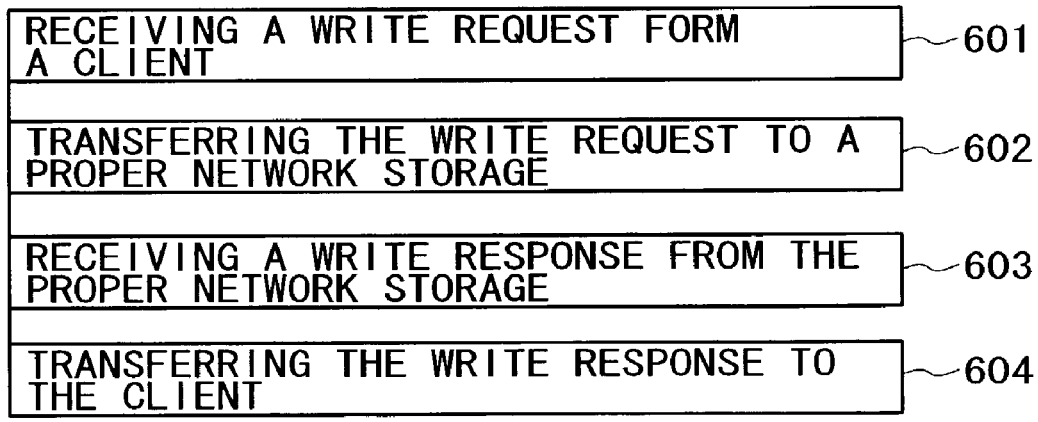
FIG. 6 is a flowchart of the processings by a WRITE processing handler 114 in the embodiment of the invention for forming the virtual network storage.

FIG. 6 shows a flowchart of the processings by the WRITE processing handler 114 in the embodiment of the invention for the method for forming the virtual network storage. In FIG. 6, reference numeral 601 denotes a step of receiving a WRITE request from a client, reference numeral 602 denotes a step of transferring the WRITE request to a proper network storage, reference numeral 603 denotes a step of receiving a WRITE response from the proper network storage, and reference numeral 604 denotes a step of transferring the WRITE response to the client.

Figure 7:
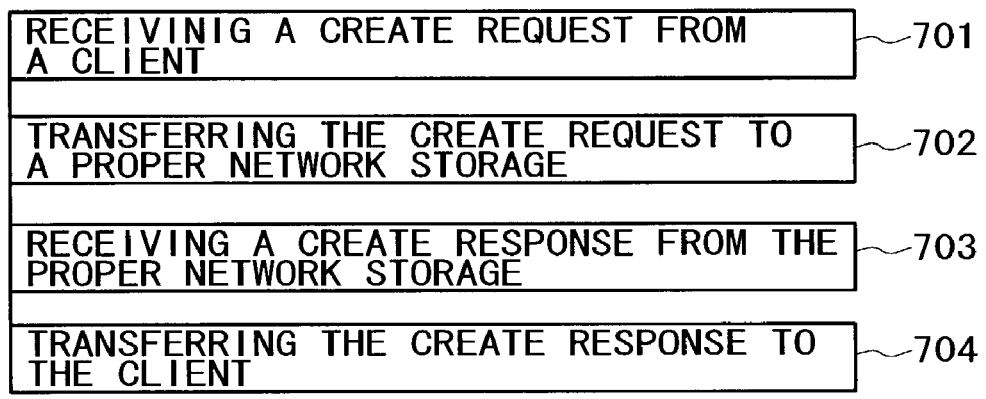
FIG. 7 is a flowchart of the processings by a CREATE processing handler 115 in the embodiment of the invention for forming the virtual network storage.

FIG. 7 shows a flowchart of the processings by the CREATE processing handler 115 in the embodiment of the invention for the method for forming the virtual network storage. Reference numeral 701 denotes a step of receiving a CREATE request from a client, reference numeral 702 denotes a step of transferring the CREATE request to a proper network storage, reference numeral 703 denotes a step of receiving a CREATE response from the proper network storage, and reference numeral 704 denotes a step of transferring the CREATE response to the client.

Figure 8:
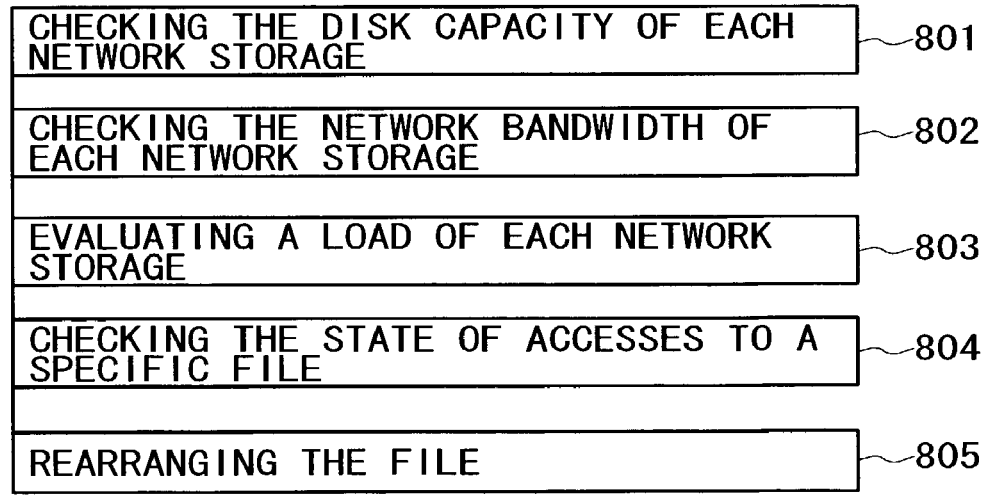
FIG. 8 is a flowchart of the processings by a load monitoring handler 118 in the embodiment of the invention for forming the virtual network storage.

FIG. 8 shows a flowchart of the processings by the load monitoring handler 118 in the embodiment of the invention for the method for forming the virtual network storage. In FIG. 8, reference numeral 801 denotes a step of checking the disk capacity of each network storage, reference numeral 802 denotes a step of checking the network bandwidth of each network storage, reference numeral 803 denotes a step of evaluating a load of each network storage, reference numeral 804 denotes a step of checking the state of accesses to a specific file, and reference numeral 805 denotes a step of rearranging the file.

In this embodiment, the controller 202 receives various requests issued from the client 201 to a network storage once, then the controller 202 transfers those requests to the network storages 211, 212, and 213. The controller 202 then combines the responses or select one of them received from the network storages 211 to 213. This is a feature of the invention.

In such a network storage access protocol as the NSF protocol described in the RFC1094, RFC1813, RFC3010, etc., a client, when accessing file data in a network storage, uses a value referred to as a file handle, not use the file name. A file handle is a value to be paired with a file in each network storage. The network storage generates the file handle. When a client obtains a file handle, the client is requested to issue a READDIR request to the network storage so as to obtain the file name from the directory and a LOOKUP request to obtain a file handle corresponding to the target file name.

In this embodiment, the READDIR request is to be processed as follows. At first, the client 201 sends the request to the controller 202, not to the network storages 211 to 213 directly. Receiving the READDIR request in the controller 202 through the LAN connection interface 103, the CPU 101 determines the request type and calls the READDIR processing handler 111 from the memory 102.

The READDIR processing handler 111, after receiving the READDIR request from the client 201 in step 301, transfers the received READDIR request to the network storages 211 to 213 through the LAN connection interface 103 in step 302. While the request sender is the client 201 and the request receiver is the controller 202 in the READDIR request received by the controller 202 from the client 201, the request sender and the request receiver are changed to the controller 202 and the network storages 211 to 213 respectively when the request is to be transferred to the network storages 211 to 213. Other additional information is also changed as needed at that time. Consequently, only the ordinary file access protocol is required to access the network storages 211 to 213; no special network storage is required. This is an effect of the invention. In addition, neither a centralized management server nor distributed directory is required. This is another effect of the invention.

Each network storage 211 to 213, after processing the received READDIR request, returns the READDIR response to the controller 202. Receiving the READDIR responses from the network storages 211 to 213 through the LAN connection interface 103 in step 303, the controller 202 combines the READDIR responses in step 304. For example, the network storage 211 returns information of file 1, file 2, and file 3, the network storage 212 returns information of file A, file B, and file C, and the network storage 213 returns information of file α, file β, and file γ to the controller 202 respectively. The controller 202 then combines those responses to generate a response consisting of file 1, file 2, file 3, file A, file B, file C, file α, file β, and file γ in step 304, then sends the combined response to the client 201 in step 305. At this time, the controller 202 and the client 201 are set as the request sender and the request receiver respectively in the response to the READDIR request from the client 201. Additional information values in the response are also determined as needed at this time. When the response obtained by combining the responses from the network storages 211 to 213 is too long to be sent to the client 201 at a time, the response is divided and sent in accordance with the file access protocol.

Since the READDIR request is processed in such a way, file blocks existing in a plurality of network storages are recognized as one file existing in just one network storage. This is why those network storages can be operated just like one network storage virtually. This is still another effect of the invention. When an error occurs in a network storage, accesses to the file blocks in the network storage are disabled. In this case, however, because the file management information and file blocks are closed in the network storage and no information related to other network storages is managed there, the network storage-occurred-error never affects other network storages. The services of the system can thus be continued. This is also still another effect of the invention. In addition, the controller 202 does not manage the correspondence between each file and each network storage, the controller 202, when an error occurs in itself, can be replaced with another so that the error is recovered easily. This is also still another effect of the invention.

In this embodiment, the LOOKUP request is to be processed as follows. At first, the client 201 sends the request to the controller 202, not to the network storages 211 to 213 directly. Receiving the LOOKUP request in the controller 202 through the LAN connection interface 103, the CPU 101 determines the request type and calls the LOOKUP processing handler 112 from the memory 102.

The LOOKUP processing handler 112, after receiving the LOOKUP request from the client 201 in step 401, transfers the received LOOKUP request to the network storages 211 to 213 through the LAN connection interface 103 in step 402. At this time, the client 201 and the controller 202 are set as the request sender and the request receiver respectively in the LOOKUP request from the client 201 and then the request sender and the request receiver are changed so as to set the controller 202 as the request sender and the network storages 211 to 213 as the request receivers respectively in prior to the transfer of the request. Other additional information in the request is also changed as needed at that time. Consequently, only the ordinary file access protocol is used to access the network storages 211 to 213. This is why no dedicated network storage is required.

Each network storage 211 to 213, after processing the received LOOKUP request, returns a LOOKUP response to the controller 202. The controller receives the LOOKUP responses through the LAN connection interface 103 in step 403. Since the LOOKUP request is a request for searching a file handle corresponding to a target file name, each network storage 211 to 213 returns an error in response to the transferred LOOKUP request when the file is not found. In this embodiment, a CREATE request processing (to be described later) assures that a unique file name is used in all the network storages in the system, thereby each network storage 211 to 213 returns at most only one successful response to the LOOKUP request. The controller 202 transfers the successful LOOKUP response to the client 201 through the LAN connection interface 103 in step 404. At this time, the controller 202 and the client 201 are set as the request sender and the request receiver respectively in the response to the LOOKUP request from the client 201. Additional information values in the response are also determined as needed at this time. When all the network storages 211 to 213 return errors, it means a case in which the requested file name is not found or an error occurs in the network storage that stores the file name. In this case, an error is returned to the client 201.

Since the LOOKUP request is processed such way, the same effects as those of the READDIR request processing can be obtained. When the client 201 obtains a file handle with the READDIR and LOOKUP request, the client 201 then issues a READ/WRITE request according to the file handle. The file handle is unique in each network storage, but not in all the network storages. Therefore, the same file handle might exist in different network storages. When a plurality of network storages are united into one virtual network in this embodiment, therefore, a mechanism is required so as to enable each network storage to be corresponded to a file handle.

One of the methods effective to realize the mechanism is to encode each file handle returned from each of the network storages 211 to 213 with use of such information as the host name and IP address specific to each network storage, then sends the encoded file handle to the client 201. Even if the network storages 211 to 213 might have the same file handle, this prevents the client 201 from receiving a plurality of same file handles. An ordinary file handle takes a limited value in length. For example, it is 32 or 64 bytes. When different file handles in different network storages are encoded, therefore, all those file handles might take the same value. In such a case, a cache memory can be used to solve the problem as to be described later in detail.

There is another method for solving the problem by caching a target file handle. Concretely, the file name, the file handle, and the information specific to a network storage that has returned the file handle are cached upon receiving of a READDIR/LOOKUP response from the network storages. When receiving a READ/WRITE request from a client with use of a file handle, the correspondence between the file handle in the cache memory and the network storage is checked, thereby it can be identified which network storage has the file handle.

The same file handle might be returned from a plurality of network storages when a LOOKUP request is processed in this embodiment. This problem can be solved, however, by combining the encoded file handle with the cached file handle. Concretely, a value obtained by encoding a file handle with information specific to a network storage is cached as a file handle to be sent to the client. To solve the problem that the same value is taken by a plurality of file handles after they are encoded as described above, the uniqueness of each encoded file handle is checked in the whole cache memory. When two or more same file handles exist in the cache memory, only those handles are encoded again. Consequently, the uniqueness of each file handle can be kept in the whole cache memory.

In this embodiment, the READ/WRITE request for a file is to be processed as follows. At first, the READ request processing will be described. The client 201 sends the request to the controller 202, not to the network storages 211 to 213 directly. Receiving the READ request in the controller 202 through the LAN connection interface 103, the CPU 101 determines the request type and calls the READ processing handler 113 from the memory 102.

The controller 202 can identify each network storage corresponding to each file handle through encoding or caching the file handler as described above. This is why the controller 202, after receiving the READ request from the client 201 in step 501, can transfer the received READ request to a proper network storage through the LAN connection interface 103 in step 502. At this time, the client 201 and the controller 202 are set as the request sender and the request receiver respectively in the READ request from the client 201 and then the request sender and the request receiver are changed so as to set the controller 202 as the request sender and the proper network storage as the request receiver respectively in prior to the transfer of the request. If the file handle from the client 201 is encoded, it is also decoded at this time. In addition, other additional information in the request is also changed as needed at that time. After that, the controller 202 receives a READ response from the proper network storage through the LAN connection interface 103 in step 503. Finally, in step 504, the controller 202 transfers the response received through the LAN connection interface 103 to the client 201 in step 504. At this time, the request sender and the request receiver are changed to the controller 202 and the client 201 respectively. Other additional information in the response is also changed as needed.

Consequently, only the ordinary file access protocol is used to access the network storages 211 to 213; no dedicated network storage is required. At this time, the controller 202 is just required to rewrite the READ request from the client 201 and the response to the request. Each network storage reads the target file actually, thereby the load of the controller 202 can be reduced.

The WRITE request processing is similar to the READ request processing except that the WRITE processing handler 114 is called instead of the READ processing handler 113. The WRITE request from the client 201 is thus sent to the controller 202, not to the network storages 211 to 213 directly. The controller 202, after receiving the WRITE request through the LAN connection interface 103, calls the WRITE processing handler 114 from the memory 102.

The controller 202 can identify each network storage corresponding to each file handler through encoding or caching the file handle as described above. Thus, the controller, when receiving the WRITE request from the client 201 in step 601, transfers the WRITE request to a proper network storage through the LAN connection interface 103 in step 602. At this time, the client 201 and the controller 202 are set as the request sender and the request receiver respectively in the WRITE request from the client 201 and then the request sender and the request receiver are changed so as to set the controller 202 as the request sender and a proper network storage as the request receiver respectively in prior to the transfer of the request. If the file handle is encoded, it is also decoded. Other additional information in the request is changed as needed at this time. Then, the controller 202 receives a WRITE response from the proper network storage through the LAN connection interface 103 in step 603. Finally, the controller 202 transfers the received response to the client 201 through the LAN connection interface 103 in step 604. At this time, the request sender and the request receiver are changed again to the controller 202 and the client 201 respectively. Other additional information in the response is also changed as needed at this time.

The WRITE request processing brings the same effect as that of the READ request processing for the system.

To create a new file in response to a CREATE request, a network storage should be selected so as to balance the load among all the connected network storages. A CREATE request in this embodiment is thus to be processed as follows. A CREATE processing request from the client 201 is not sent directly to the network storages 211 to 213, but sent to the controller 202. The controller 202, when receiving the CREATE request through the LAN connection interface 103, determines the type of the request, then calls the CREATE processing handler 115 from the memory 102.

The controller 202 can identify the lowest load network storage through the load monitoring handler 118 (to be described later). Therefore, after receiving the CREATE request from the client 201 in step 701, the controller 202 transfers the CREATE request to the proper network storage with the lowest load through the LAN connection interface 103 in step 702. At this time, the client 201 and the controller 202 are set as the request sender and the request receiver respectively in the CREATE request from the client 201 and then the request sender and the request receiver are changed so as to set the controller 202 as the request sender and the proper network storage as the request receiver respectively in prior to the transfer of the request. Other additional information in the request is also changed as needed at this time. The controller 202 then receives the CREATE responses through the LAN connection interface 103 in step 703. Finally, in step 704, the controller 202 transfers the received response to the client 201 through the LAN connection interface 103. At this time, the request sender and the request receiver are changed to the controller 202 and the client 201 respectively. The file handle returned from the network storage is encoded as needed as described above and other additional information in the response is changed as needed.

The CREATE request processing brings the same effect as that of the READ/WRITE request processing for the system. The processing is also effective to balance the load among all the connected network storages.

The load monitoring handler 118 checks the load of each network storage 211 to 213. The controller 202 activates this handler 118 periodically so as to keep updating of the data of the handler 118. The load monitoring handler 118, when it is activated such way, begins to check the access condition of the target disk in each of the network storages 211 to 213, thereby calculates the disk usage U% in step 801. In step 802, the handler 118 checks the network bandwidth access condition of each network storage 211 to 213 so as to calculate the network bandwidth usage B%. After that, the handler 118 evaluates the load of each network storage 211 to 213 in an evaluation formula $\alpha*U+\beta*B$ with use of the parameters $\alpha$ and $\beta$ for determining which of the disk capacity and the network bandwidth should be preferred in step 803. It is assumed here that the larger the value in the evaluation formula is, the larger the load of the subject network storage is. In this formula, both of $\alpha$ and $\beta$ are assumed as positive numbers. The load of each network storage evaluated here is used as a reference value in the CREATE request processing for selecting a network storage when a new file is to be created. The maximum and minimum values of the load of each network storage 211 to 213 are defined as max $(\alpha*U+\beta*B)$ and min $(\alpha*U+\beta*B)$ respectively. Then, a network storage in which a file is to be created in response to the CREATE request is selected so as to satisfy the condition in the evaluation formula max $(\alpha*U+\beta*B)$−min $(\alpha*U+\beta*B)<\sigma$ with use of the load deviation tolerance parameter $\sigma$.

Here, the "load deviation tolerance" means a degree of an allowable difference for each of the max and min values of a load to be applied to each component in the system. The components in the system are, for example, a disk capacity, etc. and the "load deviation tolerance" represents an allowable difference for each of the max and min values of the use condition of each disk. In addition to the described disk capacity, the processor usage condition, the network bandwidth usage condition, etc. can also be taken as the load components. While the tolerance mentioned above can also be represented by various methods, the parameter σ is used to represent the tolerance in this embodiment.

In step 804, the handler 118 checks the accesses to a specific file. Concretely, the handler 118 checks the access frequency FN of each network storage. The evaluation formula FN>γ is evaluated with respect to each network storage with use of an access concentration tolerance parameter γ and the handler 118 checks the access frequency FF of each file in the network storage when this formula condition is satisfied.

The "access concentration tolerance" mentioned above means an allowable degree of access concentration by the system. When the processor usage condition, the network bandwidth usage condition, the disk capacity usage, the disk access frequency, etc. of a file server are high, the state is called "access concentration". However, since in the access concentration the system performance is abruptly degraded on any of the conditions, the system is required to control the access concentration. While the tolerance is represented by various methods, the parameter γ is used for the representation in this embodiment.

Finally, in step 804, the handler 118 rearranges the files having a large FF value from a network storage having a larger FN value to a network storage having a smaller FN value in decreasing order and then reevaluate the FN to balance the FN value among the connected network storages.

Consequently, each network storage load can be balanced by the handler 118 which moves files causing the hot spot to another network storage having a smaller load in a case other than new file creation even when a hot spot occurs due to the concentration of a plurality of files that are often accessed in the same network storage.

The operation monitoring handler 116 monitors whether or not the operation of each network storage 211 to 213 is normal. When any of the network storages 211 to 213 is in erroneous operation, the handler 116 calls the special entry management handler 119 to create a virtual file entry used to denote the error state of the network storage. This special entry's file name includes information to be recognized as a virtual file reporting error information of the target network storage. This virtual file entry can be accessed just like an ordinary file except the entry does not exist in any of the network storages 211 to 213.

Consequently, the client 201 can know each error to occur in any network storage without using a dedicated console for managing the controller 202.

The error processing handler 117 manages the consistency among file names after an error-occurred network storage is recovered from the error. The "consistency" mentioned here means a state in which each file has a unique name under the same directory name. When a plurality of the same names exist in one directory (the files are actually created in different NASs), the state is referred to as "inconsistency". An inconsistency factor is, for example, an error that occurs in an NAS. This is, for example, because a file is created in a normal NAS, but the same file name might have been used in another error-occurred NAS.

According to the method for forming a virtual network storage in this embodiment, the client, when creating a file in response to a CREATE request, assures that the file name is unique in the directory. When an error occurs in a network storage and accesses to it are disabled, the same file name might be used in another network storage, thereby two same file names come to exist in the directory when the network storage is recovered from the error. This causes an inconsistent state in the directory. In order to solve this problem, the error processing handler 117 functions as follows.

The error processing handler 117 checks whether or not the same file name exists under the same directory name in the error recovered network storage. When the check result is TRUE (exist), the handler 117 changes the same file name to different name that includes the original file name and error recovery information. The error recovery information is, for example, information specific to a network storage, a recovery time, etc. Another method to solve the problem is to create a directory that includes the error recovery information in its name in the error recovered network storage, then move the subject file to the directory.

When a network storage is added to the controller 202, the error processing handler 117 checks the consistency among file names in the added network storage and other network storages united into a virtual network storage.

Consequently, the client 201 can know an inconsistency error to occur in the error recovered network storage without using a dedicated console for managing the controller 202.

The special entry management handler 119 manages the virtual entries used to report error information. In addition the handler 119 also supplies the virtual directory entries when any one of the network storages 211 to 213 is specified and accessed respectively. Each virtual directory, that is, special entry has a virtual directory name, which includes information intended to access the specific network storage. All of various types of accesses to the virtual directory entry are transferred to a specific network storage. The virtual directory entry can be accessed just like an ordinary directory while the entry does not exist in any of the network storages 211 to 213.

Consequently, the client 201 can specify a specific network storage and moves a file to the specified network storage without using a dedicated console for managing the controller 202. This function is needed, for example, to disconnect a specific network storage from the controller 202.

While an NFS protocol is supposed to be used in this embodiment, any other protocols can apply to this embodiment easily.

While a file handle is encoded with use of information specific to each network storage in this embodiment, any other encoding method can apply to the file handle.

While both disk capacity and network bandwidth are referred to as load factors in this embodiment, other load elements, such as a processor load of a network storage, an internal disk bandwidth, etc. can be taken as load factors.

According to the invention, therefore, a virtual network storage can be formed only by general network storages without using dedicated network storages.

When various components included in the scope of this invention are added to the system, the following effects are also realized. For example, a virtual network storage can be formed without using any of the concentrated management server and distributed directories.

When an error occurs in a network storage, other servers are protected from the error, thereby services never stop.

Since the controller 202 that forms a virtual network storage is not required to know locations of stored file blocks, when an error occurs in the controller 202, the controller 202 can be replaced with another to recover the error.

The controller 202 that forms a virtual network storage is just required to rewrites the response to process the READ/

WRITE request. Actually, each network storage processes the READ/WRITE request, thereby the load in the controller can be reduced.

To create a new file, the CREATE request is transferred to a proper network storage having a low load. The load of each network storage can thus be balanced.

When a file to be often accessed is stored in a specific network storage, the file can be moved to another network storage, thereby the access load can be balanced among network storages.

The client can know each occurred network storage error through a virtual file entry created so as to report error information; there is no need to use any dedicated console.

If a file name inconsistency error occurs when a network storage is recovered from an error, the client can know the inconsistency error without using a dedicated console; the file name used in the error occurred network storage is changed to a file name that includes the error recovery information at this time.

The client can specify a specific network storage and moves a file to the network storage without using a dedicated controller; a virtual directory entry used to specify an access to the specific network storage is created at this time.

The foregoing invention has been described in terms of preferred embodiments. However, those skilled, in the art will recognize that many variations of such embodiments exist. Such variations are intended to be within the scope of the invention and the appended claims.

What is claimed is:

1. A method of a virtualization controller coupled to a client and a plurality of network storages, and forming a virtual network storage by using said plurality of network storages so that accesses to said plurality of network storages are done just like accesses to one network storage, said method comprising the steps of:
    receiving a file list request from said client to said virtualization controller, said file list request being used to request a file list from a virtual directory of said virtual network storage;
    transferring first and second file list requests corresponding to said received file list request to each of first and second network storages after converting a source address and a target address of said received file list request for access to each of directories of said first and second network storages, said directories corresponding to said virtual directory, said converted source address being an address of said virtualization controller, said converted target address being an address of said first or second network storage;
    receiving a first file list from said first network storage in response to said transferred first file list request;
    receiving a second file list from said second network storage in response to said transferred second file list request, said second file list being different from said first file list;
    combining both said first and second file lists into a combined file list;
    sending said combined file list from said virtualization controller to said client;
    receiving a request generated by said client according to said combined file list sent to said client;
    determining a network storage to which said received request is to be transferred according to said combined file list received from said network storage;
    transferring said request to said determined network storage;
    receiving a response from said network storage in response to said transferred request; and
    transferring said received response to said client.

2. The method according to claim 1, wherein said method further includes the step of:
    encoding an access identifier set in a response from said network storage with use of information specific to said network storage.

3. The method according to claim 1, wherein said method further includes the step of:
    storing at least said network storage identification information and said access identifier set in said network storage response in a buffer area.

4. The method according to claim 1 further comprising the step of:
    managing the consistency among entry information of said plurality of network storages.

5. The method according to claim 4, wherein said method further includes the steps of:
    detecting whether or not an error-occurred network storage is recovered from said error;
    checking the consistency between the entry information of said error-occurred network storage and the entry information of said plurality of network storage operating normally so as to manage said consistency among said entry information; and
    changing the identifier of entry information in said error-occurred network storage when a consistency error occurs.

6. The method according to claim 4, wherein said method further includes the steps of:
    detecting whether or not an error-occurred network storage is recovered from said error;
    checking the consistency between the entry information of said error-occurred network storage and the entry information of said plurality of network storage operating normally so as to manage the consistency among said entry information;
    generating an inconsistency management entry in said error-occurred network storage when an inconsistency error occurs therein; and
    moving said inconsistency-occurred entry to said inconsistency management entry.

7. The method according to claim 4, wherein said method further includes the step of:
    registering information of a new network storage; and
    wherein said method, upon managing the consistency among said entry information, further includes the steps of:
    checking the consistency between the entry information of each of said plurality of network storages included in said virtual network storage and the entry information of said new network storage; and
    changing the identifier of said inconsistency-occurred entry information in said new network storage when an inconsistency occurs therein.

8. The method according to claim 4, wherein said method further includes the step of:
    registering information of a new network storage; and
    wherein said method, upon managing the consistency among said entry information, further includes the steps of:
    checking the consistency between the entry information of each of said plurality of network storages included in said virtual network storage and the entry information of said new network storage;

generating an inconsistency management entry in said new network storage when an inconsistency occurs therein; and moving said inconsistency-occurred entry to said inconsistency management entry.

9. The method according to claim 1 further comprising the steps of:

generating a virtual entry that denotes specific one of said plurality of network storages included in said virtual network storage;

determining whether or not a request from a client is addressed to said virtual entry; and transferring said request from said client to said specific network storage when said client request is addressed to said virtual entry.

10. The method according to claim 1, wherein said method further comprises the step of:

balancing the load of accesses to said plurality of network storages.

11. The method according to claim 10, wherein said method, upon balancing said load, further includes the steps of:

monitoring the load of each of said plurality of network storages;

selecting one of said plurality of network storages, which has the lowest load; and transferring a new data write request received from a client to said selected network storage.

12. The method according to claim 10, wherein said method, when balancing said load, further includes the steps of:

monitoring concentration of accesses to each of said plurality of network storages;

monitoring concentration of accesses to a specific entry of each of said plurality of network storages;

specifying a tolerance limit of access concentration to a specific network storage;

identifying each network storage exceeding said tolerance limit according to the result of access concentration monitoring performed for each of said network storages;

identifying an entry on which accesses are concentrated in said network storage that exceeds said tolerance limit; and moving said entry on which said accesses are concentrated to one of said plurality of network storages, which does not exceed said tolerance limit.

13. The method according to claim 10, wherein said method, when balancing said load, further includes the steps of:

monitoring the load of each of said plurality of network storages;

specifying a tolerance limit of the load deviation among said plurality of network storages;

identifying each of said plurality of network storages, which exceeds said tolerance limit;

identifying an entry that causes a factor for exceeding said tolerance limit among those of said plurality of network storages that exceed said tolerance limit; and moving said factor entry to any of said plurality of network storages, which does not exceed said tolerance limit.

14. The method according to claim 1 further comprising the step of:

storing information required to operate said virtual network storage in each of said plurality of network storages united into said virtual network storage.

15. The method according to claim 1, further comprising the steps of:

registering the identifier of each of said plurality of network storages;

registering information for accessing each of said plurality of network storages; and registering information for managing said plurality of network storages.

16. The method according to claim 1, wherein said file list request is a READDIR request.

17. The method according to claim 1, wherein said file list request is used to request a plurality of file handlers of a plurality of files.

18. A method of a virtualization controller coupled to a client and a plurality of network storages, and forming a virtual network storage by using said plurality of network storages so that accesses to said plurality of network storages are done just like accesses to one network storage, said. method. comprising the steps of:

receiving a file list request from said client to said virtualization controller, said file list request being used to request a file list from a virtual directory of said virtual network storage;

transferring file list requests corresponding to said received file list request to each of said plurality of network storages after converting a source address and a target address of said received file list request for access to each of directories of said plurality of network storages, said directories corresponding to said virtual directory, said converted source address being an address of said virtualization controller, said converted target address being an address of said plurality of network storages;

receiving file lists from said plurality of network storages in response to said transferred file list requests, said file lists being different from one other, determining whether or not each of said received file lists is successful;

combining only successful file lists as determined in said determining step into a combined file list;

sending said combined file list from said virtualization controller to said client;

receiving a request generated by said client according to said combined file list sent to said client;

determining a network storage to which said received request is to be transferred according to said combined file list received from said network storage;

transferring said request to said determined network storage;

receiving a response from said network storage in response to said transferred request; and transferring said received response to said client.

19. The method according to claim 18, wherein said method further includes the step of:

encoding an access identifier set in a response from said network storage with use of information specific to said network storage.

20. The method according to claim 18, wherein said method further includes the step of:

storing at least said network storage identification information and said access identifier set in said network storage response in a buffer area.

21. A method of a virtualization controller coupled to a client and a plurality of network storages, and forming a virtual network storage by using said plurality of network storages so that accesses to said plurality of network storages are done just like accesses to one network storage, said method comprising the steps of:

receiving a file list request from said client to said virtualization controller, said file list request being used to request a file list from a virtual directory of said virtual network storage;

transferring file list requests corresponding to said received file list request to each of said plurality of network storages after converting a source address and a target address of said received file list request for access to each of directories of said plurality of network storages, said directories corresponding to said virtual directory, said converted source address being an address of said virtualization controller, said converted target address being an address of said plurality of network storages;

receiving file lists from said plurality of network storages in response to said transferred file list requests, said file lists being different from one other;

determining whether or not each of said received file lists is successful;

combining successful file lists selected from among successful responses into a combined successful file list;

sending said combined successful file list as determined in said determining step from said virtualization controller to said client;

receiving a request generated by said client according to said combined successful file list sent to said client;

determining a network storage to which said received request is to be transferred according to said combined successful file list received from said network storage;

transferring said request to said determined network storage;

receiving a response from said network storage in response to said transferred request, and transferring said received response to said client.

22. The method according to claim 21, wherein said method further includes the step of:

encoding an access identifier set in a response from said network storage with use of information specific to said network storage.

23. The method according to claim 21, wherein said method further includes the step of:

storing at least said network storage identification information and said access identifier set in said network storage response in a buffer area.

24. A method of a virtualization controller coupled to a client and, a plurality of network storages, and forming a virtual network storage by using said plurality of network storages so that accesses to said plurality of network storages are done just lake accesses to one network storage, said method comprising the steps of:

detecting an operation state of each of a plurality of network storages;

generating an entry that includes error information for each detected error;

receiving a file list request from a client to said virtualization controller, said file list request being used to request a file list from a virtual directory of said virtual network storage;

transferring file list requests corresponding to said received file list request to each of said plurality of network storages after converting a source address end a target address of said received file list request for access to each of directories of said plurality of network storages, said directories corresponding to said virtual directory, said converted source address being an address of said virtualization controller, said converted target address being an address of said plurality of network storages;

receiving file lists from said plurality of network storages in response to said transferred file list requests, said file lists being different from one other;

generating a combined file list in response to said file list request by combining the file lists from network storages operating normally among said plurality of network storages anal the entry information that includes said generated error information;

sending said generated combined file list from said virtualization controller to said client;

receiving a request generated by said client according to said combined file list sent to said client;

determining a network storage to which said received request is to be transferred according to said combined file list received from said network storage;

transferring said request to said determined network storage;

receiving a response from said network storage in response to said transferred request; and transferring said received response to said client.

\* \* \* \* \*